3,334,048
HYDRAULIC FLUIDS
Norman Ernest Frederick Hitchcock, Robert Alan Cameron Ker, and Robert Carswell, London, England, assignors to Castrol Limited, London, England, a British company
No Drawing. Filed Jan. 13, 1964, Ser. No. 337,181
Claims priority, application Great Britain, Jan. 17, 1963, 2,194/63
8 Claims. (Cl. 252—77)

This invention is for improvements in or relating to hydraulic fluids and is particularly concerned with liquids employed as the power transmitting medium in hydraulic brake systems for vehicles, for example, motor cars and aeroplanes.

Hydraulic brake systems comprise metal and rubber parts which are exposed to the liquid employed as the power transmitting medium and it is essential that a liquid be used which has little, if any, attack on either the metal or the rubber parts of the brake system, either at ordinary temperatures or at the elevated temperatures which are set up in the parts of the system adjacent to the braking surfaces during a prolonged application of the brakes. It is furthermore essential that the hydraulic transmission medium should be stable and of a high boiling point such as not to vaporise to any substantial exten under operating conditions. Again, the liquid should have a low freezing point to withstand low operating temperatures which obtain either during cold weather, or in the case of aircraft, during high altitude flight. In addition, it is necessary that the liquid shall have a sufficiently low viscosity to render the system readily operable, the viscosity not changing to any material extent under operating conditions. Finally, further important considerations are that the liquid shall have a low rate of vaporisation and also sufficient lubricating properties properly to lubricate the moving parts of the system.

It is a common practice to employ as hydraulic fluids mixtures of castor oil with one or more relatively nonvolatile solvents of low viscosity and low freezing point. Examples of such solvents are diacetone alcohol and various glycol ethers such as the methyl, ethyl or butyl monoethers of ethylene, diethylene or polyethylene glycols.

While compositions comprising castor oil have been used satisfactorily as hydraulic fluids for a number of years, they have serious limitations at very low temperatures, since on storage at temperatures of, e.g. —40° F., solidification takes place. The low temperature properties of such fluids may be improved by substituting blown castor oil for castor oil but these fluids, though pouring satisfactorily at temperatures down to —80° F., tend to become opaque on storage at —40° F. They thus fail the Society of Automotive Engineers (S.A.E.) 70 R.3 Specification —40° F. cold test clarity requirements.

Fluids having greatly improved low temperature properties may be formulated based upon wholly synthetic materials, in particular mixtures of polyethylene glycols and ethers of polyethylene glycols, and various additives may be added to inhibit corrosion. Such fluids are eminently satisfactory from many points of view but they have the serious disadvantage that they lack lubricity as compared with fluids containing castor oil.

Hydraulic brake fluids used in motor cars are normally required to operate not only the brakes but the clutch also, and it is most important that the fluid should possess adequate lubricity, as otherwise wear takes place in the cylinders of the brake and clutch systems, particularly the latter, resulting in the production of small metal wear particles which abrade the rubber seals, resulting in leakage of the fluid from the system.

The lubricity of a hydraulic fluid is normally measured by subjecting it to a brake or clutch "stroking" test in which the actual brake or clutch mechanism is subjected to a large number of cycles. The condition of the rubber seals, cylinder bores and pistons are carefully examined for wear. With a fluid of poor lubricity, failure occurs due to excessive leakage past worn seals, often before the normal number of strokes are completed. In a typical clutch "stroking" test it was found, for example, that whereas more than 500,000 cycles could readily be obtained using hydraulic fluids based on castor oil, a typical wholly synthetic polyglycol based fluid failed after only 200,000 cycles.

The deficient lubricating properties of synthetic polyglycol based hydraulic fluids may be remedied by the introduction of additives but the selection of suitable additives is a very difficult matter, since it is not only necessary to impart a high degree of lubricity to the fluid but the additives employed must not cause corrosion of any of the metals likely to come into contact with the fluid, nor must they cause incompatibility with other fluids with which it is likely to be mixed in service. It is normally necessary in any event to have corrosion inhibitors present to inhibit the corrosive action of the polyglycol ethers and the lubricity additives clearly must not interact with these inhibitors.

It has been found that certain compounds as hereinafter defined may be used in hydraulic or functional fluids to confer on such fluids beneficial properties particularly with relation to the lubricity of the fluid.

According to the present invention there is provided a hydraulic or functional fluid comprising a major proportion of a base fluid of one or more polyoxyalkylene glycols or ethers thereof having dissolved therein a minor proportion, sufficient to increase lubricity of the fluids, of one or more of the following additives:

(a) an ortho phosphate or a sulphate salt of a primary or secondary aliphatic amine having a total of 4 to 24 carbon atoms,
(b) a dialkyl citrate having an average of from 4 to 13 carbon atoms in the alkyl groups, and
(c) a polyester prepared from an aliphatic dicarboxylic acid having the general formula

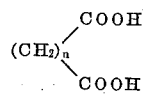

where $n$ is an integer of from 2 to 10, and a polyalkylene glycol having the formula $HOR(OR)_mOH$ where $m$ is 1 to 10, and where R is an ethylene, propylene or butylene diradical.

The base fluid may have a viscosity of from 3 to 8, preferably 4 to 6 centistokes at 210° F.

Additives (a), (b) or (c) are employed in accordance with the present invention in concentrations ranging from 0.1% or from the minimum necessary to increase the lubricity of the fluid to the desired degree to 5% or more and preferably within the range from 0.5 to 1.5% by weight on the weight of the base fluid.

Specific examples of additives in accordance with the present invention are:

(a) Di-n-butylamine orthophosphate
Diamylamine orthophosphate
Dinonylamine orthophosphate
Oleylamine orthophosphate
Dioctylamine sulphate
Diamylamine sulphate
$\gamma(\beta'$-Hydroxy-$\beta$-ethoxy ethoxy) propylamine orthophosphate
Diethylamine orthophosphate
Dilaurylamine orthophosphate
Dinonylamine sulphate (b) Dinonyl citrate
Diamyl citrate
Di(2-ethyl hexyl) nitrate
Dilauryl citrate
Ethyl isoamyl citrate (c) Polyethylene sebacate drived from a polyethylene glycol of M.W. 200
Polyethylene azelate derived from a polyethylene glycol of M.W. 200
Polyethylene adipate derived from a polyethylene glycol of M.W. 200
Polyethylene/polypropylene glutarate derived from mixed polyglycols of average M.W. of about 200
Triethylene sebacate
Diethylene-1,12-dodecane dioate
Tripropylene adipate
Dibutylene succinate In the foregoing examples, nonyl is preferably 3,5,5-trimethyl hexyl. In employing the polyesters of class (c) mixtures of polyhydric alcohols may be employed, if desired.

It is preferred that the additives used in putting this invention into practice are the additives of class (c).

It is necessary to adjust the pH of the hydraulic fluid finally to above 7 by the addition of an alkylamine, e.g. diamylamine, morpholine or triethanolamine. Preferably the resulting fluid will have a pH of at least 8.

The invention also provides a preferred hydraulic fluid comprising a major proportion of a base fluid consisting of one or more polyoxyalkylene glycols or ethers thereof having dissolved therein from 0.5 to 2.0 percent by weight on the weight of the base fluid of a polyester prepared from an aliphatic dicarboxylic acid having a general formula

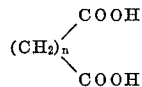

where $n$ is from 4 to 8, and a polyalkylene glycol having the formula $HOR(OR)_mOH$ where $m$ is 2 to 4, said fluid having a pH of at least 8 obtained by the presence of a non-volatile amine, wherein said base fluid has a viscosity of from 4 to 6 centistokes at 210° F. The fluids preferably contain from 0.05 to 0.2% of benzotriazole.

The preparation of two typical polyesters of the preferred class (c) are described in the following Examples I and II.

*Example I*

80.9 gm. (0.4 mole) of sebacic acid, 80 gm. (0.40 mole) of "Polydiol 200," 2.48 gm. (0.04 mole) of ethylene glycol and 0.2 gm. of anhydrous $ZnCl_2$ were weighed into a 500 ml. 3-necked flask fitted with nitrogen bleed, thermometer pocket, steam heated fractionating column, still head and condenser. The mixture was heated to 200° C. with steam passing through the fractionating column. The mixture darkened considerably during the first hour. Heating was continued for 21 hours, acidity values being done every 7 hours.

Mgm. KOH/gm.
(1) After 7 hours _____ 12.4
(2) After 14 hours _____ 3.0
(3) After 21 hours _____ 1.65

The mixture was vacuum stripped at 200° C. at 2 mm. pressure for a further 7 hours, after which the acidity was found to be 1.55 mgm. KOH/gm. The reaction mixture was stirred with fuller's earth and filtered through a steam heated funnel. 91 gm. of a clear brown product of acidity 3.1 mgm. KOH/gm. was obtained.

Yield _____ gm__ 91
Percent yield _____ 61
Hydroxyl value _____ 6.9

The high acidity of the final product was almost certainly due to the dampness of the fuller's earth used.

"Polydiol 200" was a polyethylene glycol of molecular weight about 200, containing some polypropylene glycol.

*Example II*

The preparation was carried out in exactly the same way as that for Example I using 101 gm. (0.5 mole) of sebacic acid, 120 gm. (0.5 mole+20% excess) of "Polyethylene glycol 200" and 0.25 mole of anhydrous $ZnCl_2$. Reaction time before vacuum stripping however was 14 hours only.

Mgm. KOH/gm.
Acidity after 7 hours_____ 6.2
Acidity after 14 hours_____ 1.7
Acidity after 7 hours vacuum stripping_____ 2.0

After fuller's earth treatment and filtration through a steam heated funnel, 155 gm. of clear brown product of 4.8 mgm. KOH/gm. acidity was obtained. The product was treated with dry fuller's earth and again filtered to yield a polyester of acidity 1.25 mgm. KOH/gm.

Yield _____ gm__ 155
Percent yield _____ 76
Hydroxyl value _____ 30.2

Polyethylene glycol 200 was a commercially available mixture of polyethylene glycols of molecular weight about 200.

Compositions containing additives of class (a) have been found prone to cause incompatibility with a standard compatibility fluid employed in the S.A.E. 70 R3 specification compatibility test. It has been found that this difficulty may be overcome by the addition to the fluid of 0.5–2.0% by weight of tartaric acid. This acid appears to be quite specific and, although closely related acids such as lactic and citric acid are somewhat effective, a large amount of lactic acid is required and the introduction of a large amount significantly lowers the boiling point; on the other hand, it has been found that citric acid gives rise to corrosion troubles.

Following is a description by way of example of hydraulic fluids according to the invention.

*Example III*

P.b.w.
Polyethylene glycol 200 _____ 18.0
Ethylene glycol _____ 12.0
Fluid A _____ 24.0
Fluid B _____ 23.0
Fluid C _____ 23.0
Tartaric acid _____ 1.5
Orthophosphoric acid _____ 0.6
Di-n-butylamine _____ 3.4

Fluid A was a commercially available mixture of the monoethyl ethers of di- and triethylene glycols. Fluid B was a similar material from a different source and Fluid C was also similar but contained in addition some diethylene glycol monobutyl ether and about 10% of polyethylene glycol 200.

This fluid had a pH of 7.7 and good lubricity.

*Example IV*

|  | P.b.w. |
|---|---|
| Polyethylene glycol 200 | 25.0 |
| Fluid A | 25.0 |
| Fluid B | 25.0 |
| Fluid C | 25.0 |
| Dinonyl citrate | 1.0 | tions permitted by the fluid before break-down took place was recorded.

In this test typical synthetic hydraulic fluids based on polyoxyalkylene glycol ethers failed after about 2500 to 2950 revolutions, whereas a typical fluid based on ethylene oxide treated castor oil would normally fail after 3,300 to 3,400 revolutions.

A number of results obtained on the Pin and Disc machine are listed in Table I, from which the effectiveness of the lubricity additives of the present invention will be readily apparent.

TABLE I.—PIN & DISC MACHINE TESTS

| Blend No. | Base Fluid | Composition of Blend | | | | Time to failure (number of revolutions) |
|---|---|---|---|---|---|---|
| | | Lubricity Additive | Percent | Other Additives | Percent | |
| 1 | X | None | | None | | 2,700–2,950 |
| 2 | X | Diamylamine phosphate | 1 | Morpholine / Benzotriazole | 0.25 / 0.1 | Over 3,200 |
| 3 | X | Diamylamine sulphate | 2.1 | Diamylamine | 1.8 | 3,100 |
| 4 | X | "Reoplex 400" | 1 | Di-n-butylamine | 0.05 | 3,200 |
| 5 | X | Polyester from Example I | 2 | ---do--- | 0.05 | 3,000 |
| 6 | X | Polyester from Example II | 1 | ---do--- | 0.05 | 3,350 |
| 7 | Y | None | | None | | 2,600 |
| 8 | Y | "Reoplex 400" | 1 | Di-n-butylamine / Benzotriazole | 0.05 / 0.05 | 3,350 |
| 9 | Z | ---do--- | 1 | Di-n-butylamine / Benzotriazole | 0.05 / 0.05 | 3,200 |
| 10 | | Composition of Example III | | | | 3,200 |

*Example V*

|  | P.b.w. |
|---|---|
| Polyethylene glycol 200 | 24.0 |
| Fluid A | 10.9 |
| Fluid B | 11.0 |
| Fluid C | 24.0 |
| Fluid D | 24.0 |
| Ethylene glycol | 5.0 |
| "Reoplex 400" | 1.0 |
| Benzotriazole | 0.05 |
| Di-n-butylamine | 0.05 |

Fluid D was a commercially available material containing about 75% of mixed glycol ethers and about 25% of a polypropylene glycol of molecular weight of about 400–1000.

"Reoplex 400" was a commercially available polyester of class (c), and was a polyethylene adipate derived from a polyethylene glycol of molecular weight about 200.

*Example VI*

|  | P.b.w. |
|---|---|
| Polyethylene glycol 200 | 25.0 |
| Fluid A | 25.0 |
| Fluid B | 25.0 |
| Fluid C | 25.0 |
| Diamylamine phosphate | 1.0 |
| Morpholine | 0.25 |
| Benzotriazole | 0.1 |

In order to demonstrate the effectiveness of the additives of the present invention in increasing the lubricity of synthetic hydraulic fluids comprising a major proportion of one or more polyoxyalkylene glycols or ethers thereof, a series of tests were carried out on a Wear testing machine of the Pin and Disc type which had been shown to give reasonable correlation with the clutch "stroking" test already referred to. This machine consisted of a horizontal rotating steel disc in contact with an aluminum rider, the steel and aluminum being typical of those in common use in brake cylinders. The disc was rotated at 100 r.p.m. and 0.1 ml. of the fluid dropped on to the disc so that it covered the whole of the surface. A load of 500 grams was applied to the rider and rotation of the disc was continued until the coefficient of friction rose to a value of 0.4. The number of revolu- In Table I, the compositions of the base fluids were as follows:

Base Fluid X=
  25% Polyethylene glycol 200
  25% Fluid A
  25% Fluid B
  25% Fluid C Base Fluid Y=
  18% "Polyglycol P.6"
  82% Mixture of equal parts by weight of Fluids A, B and C.

Base Fluid Z=The base fluid of Example V (i.e., the first six components).

"Polyglycol P.6" was a mixture of polyglycols, similar in properties to "Polyethylene Glycol 200".

Blend No. 2 was the composition of Example VI.

Blend No. 9 was the composition of Example V.

The compositions of Examples III, V and VI and Blend No. 5 of Table I, were subjected to clutch "stroking" tests and satisfactorily survived 500,000 cycles.

In order to demonstrate that the lubricity additives of the present invention had no deleterious effect upon the various metals normally present in braking systems, a series of tests were carried out employing the Standard Society of Automotive Engineers (S.A.E.) Corrosion test, designated SAE.70R3, the results being listed in Table II. In this test a number of metal strips were belted together and placed in the fluid in the presence of 5% by weight of water and heated in an oven for 5 days at 100° C., a piece of rubber also being present. In order to pass this test, the change in weight of the tinned iron, mild steel and cast iron specimens must not exceed 0.2 mgms./cm.$^2$, the change in weight of the brass and copper specimens must not exceed 0.5 mgms./cm.$^2$, whilst the change in weight of the aluminium specimens must not exceed 0.1 mgms./cm.$^2$. No pitting or excessive staining of any of the specimens is permissible. From these results it will be apparent that the lubricity additives of the present invention had no deleterious effect on the various metals involved. On the other hand, two blends, designated Blends R and S respectively, which contained lubricity additives of different types, were not satisfactory. It should be emphasised that in order to pass the SAE 70R3 Corrosion test, the fluid should have a pH of not less than 7 and this was in all cases ensured by the addition of minor proportions of amines as indicated in the examples.

TABLE II.—S.A.E. 70R3 CORROSION TESTS

| Blend No. | Base Fluid | Additive(s) present | Percent Additives | Change in wt. (mg./sq. cm.) of— | | | | | |
|---|---|---|---|---|---|---|---|---|---|
| | | | | Tinned Iron | Mild Steel | Aluminium | Cast Iron | Brass | Copper |
| 2 | X | Diamylamine phosphate<br>Morpholine<br>Benzotriazole | 1<br>0.25<br>0.1 | Nil | −0.004 | −0.004 | +0.021 | −0.050 | −0.029 |
| 3 | X | Diamylamine sulphate<br>Diamylamine | 2.1<br>1.8 | −0.009 | −0.004 | Nil | +0.022 | −0.008 | −0.029 |
| 4 | X | Reoplex 400<br>Di-n-butylamine | 1.0<br>0.05 | −0.009 | Nil | +0.013 | +0.046 | +0.004 | Nil |
| 5 | X | Polyester from Example 1<br>Di-n-butylamine | 2.0<br>0.05 | Nil | +0.013 | +0.004 | +0.068 | −0.004 | −0.038 |
| 6 | X | Polyester from Example 2<br>Di-n-butylamine | 1.0<br>0.05 | Nil | −0.004 | +0.046 | +0.068 | −0.008 | −0.132 |
| 10 | | Composition of Example III | | −0.005 | +0.004 | Nil | +0.022 | −0.021 | −0.050 |
| Blend R | X | Dibutyl phosphite | 1.0 | −0.56 | Nil | +0.021 | −0.004 | −0.008 | −0.008 |
| Blend S | ZZ | Acid methyl phosphate<br>Diamylamine<br>Benzotriazole | 0.5<br>2.5<br>0.1 | −4.7 | −5.2 | −0.26 | −6.35 | −0.033 | −0.029 |

Blend ZZ=30% Polyethylene glycol 200; 20% Ethylene glycol; 25% Fluid A; 25% Fluid B.
Percent of additive is based on the weight of the base fluid.

We claim:
1. A hydraulic fluid consisting essentially of a base fluid selected from the group consisting of polyoxyalkylene glycols and ethers thereof, said base fluid having dissolved therein from 0.1 to 5.0% by weight on the weight of the base fluid, to increase lubricity of the fluids, of a polyester prepared from an aliphatic dicarboxylic acid having the general formula

$$(CH_2)_n \diagup^{COOH}_{\diagdown COOH}$$

where $n$ is an integer of from 2 to 10, and a polyalkylene glycol having the formula $HOR(OR)_mOH$ where $m$ is from 1 to 10 and where R is selected from the group consisting of ethylene, propylene and butylene groups, said hydraulic fluid having a pH above 7.

2. A hydraulic fluid as claimed in claim 1 wherein the polyester is present in a proportion of from 0.5 to 2.0 percent by weight on the weight of the base fluid.

3. A hydraulic fluid as claimed in claim 1 wherein $n$ is from 4 to 8.

4. A hydraulic fluid as claimed in claim 1 wherein $n$ is 2 to 4.

5. A fluid as claimed in claim 1 wherein the polyester is one selected from the group consisting of:
Polyethylene sebacate derived from a polyethylene glycol of M.W. 200,
Polyethylene azelate derived from a polyethylene glycol of M.W. 200,
Polyethylene adipate derived from a polyethylene glycol of M.W. 200,
Polyethylene/polypropylene glutarate derived from mixed polyglycols of average M.W. of about 200,
Triethylene sebacate.

6. A fluid as claimed in claim 1 in which the pH of the fluid is adjusted to a value above pH 8 by the addition of an amine selected from the group consisting of diamylamine, morpholine, triethanolamine and a mixture of these compounds.

7. A fluid as claimed in claim 1 wherein the fluid comprises from 0.05 to 0.20% by weight on the weight of the base fluid of benzotriazole.

8. A hydraulic fluid consisting essentially of a base fluid selected from the group consisting of polyoxyalkylene glycols or ethers thereof having dissolved therein from 0.5 to 2.0 percent by weight on the weight of the base fluid of a polyester prepared from an aliphatic dicarboxylic acid having a general formula $$(CH_2)_n \diagup^{COOH}_{\diagdown COOH}$$

where $n$ is from 4 to 8, and a polyalkylene glycol having the formula $HOR(OR)_mOH$ where $m$ is 2 to 4, and R is selected from the group consisting of ethylene, propylene and butylene groups, said fluid having a pH of at least 8 obtained by the presence of a non-volatile amine, wherein said base fluid has a viscosity of from 4 to 6 centistokes at 210° F.

References Cited

UNITED STATES PATENTS

| | | | |
|---|---|---|---|
| 2,499,551 | 3/1950 | White | 252—78 X |
| 2,584,086 | 1/1952 | Wachter et al. | 252—77 |
| 3,115,465 | 12/1963 | Orloff et al. | 252—78 X |

FOREIGN PATENTS

| | | |
|---|---|---|
| 456,664 | 11/1936 | Great Britain. |
| 867,181 | 5/1961 | Great Britain. |

LEON D. ROSDOL, *Primary Examiner.*

R. D. LOVERING, S. D. SCHWARTZ,
*Assistant Examiners.*